Oct. 5, 1965  HITOSI IYOI  3,209,611
TEETH PROFILES OF ROTORS FOR GEAR PUMPS OF ROTARY TYPE
Filed May 2, 1961  2 Sheets-Sheet 1

INVENTOR.
HITOSI IYOI
BY
ATTORNEY

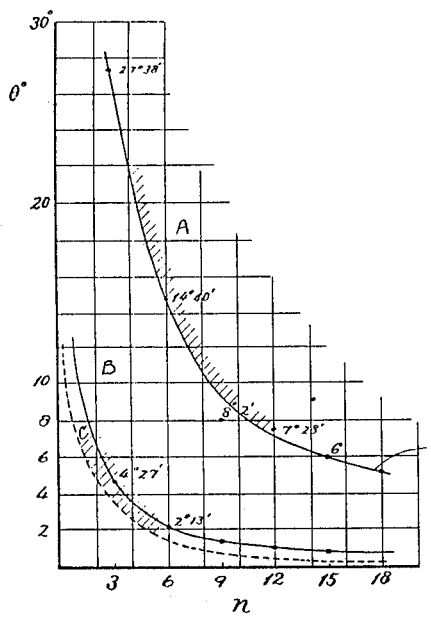
Fig. 9.
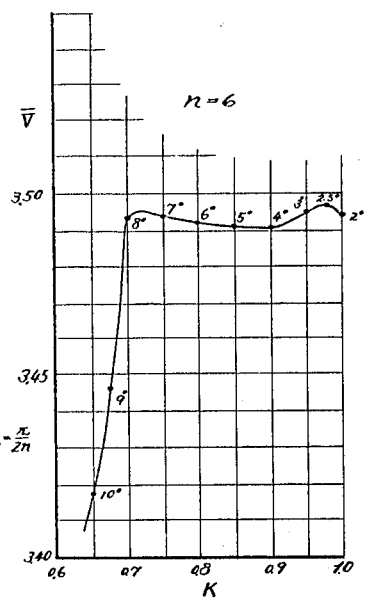
Fig. 10.
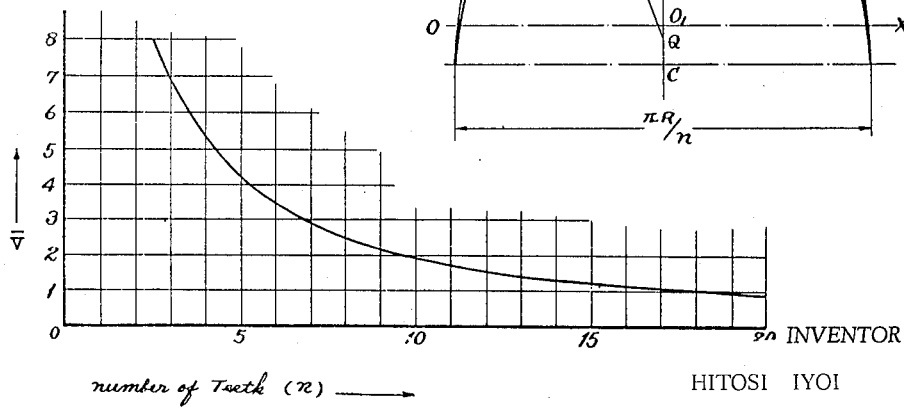
Fig. 11.
Fig. 12.

United States Patent Office 3,209,611
Patented Oct. 5, 1965

3,209,611
TEETH PROFILES OF ROTORS FOR GEAR PUMPS OF ROTARY TYPE
Hitosi Iyoi, 470 1-chome, Narashino, Chiba Prefecture, Japan
Filed May 2, 1961, Ser. No. 126,734
5 Claims. (Cl. 74—462)

This invention relates to gear pumps and more particularly to the profile of the teeth of the gears.

The efficiency of a gear pump is dependent on the shape of the teeth and it is therefore an object of this invention to change the teeth in a manner to increase the pumping efficiency, to reduce cyclic fluctuations of delivery and torque and to reduce the loading of the pump bearings over gear pumps having involute teeth.

In order to carry out the object of the invention I shape the teeth in a manner to eliminate the pockets between the tape of the teeth and the base of the teeth of the cooperating rotor.

A complete understanding of the invention may be had by reference to the written description in conjunction with the accompanying drawing wherein:

FIG. 9 is a graph showing the relation of pressure angle to the number of teeth;

FIG. 10 is a graph showing the delivery rate of the gear pump having the teeth profile of the invention to the coefficient of ellipse in the case where the number of teeth is six;

FIG. 11 is a sectional view of the rack which corresponds to the sectional view of the tooth profile of FIG. 5;

FIG. 12 is a graph showing the delivery rate of a gear pump having teeth generated by or derived from a circular arc not larger than a semi-circle.

Figure 1:
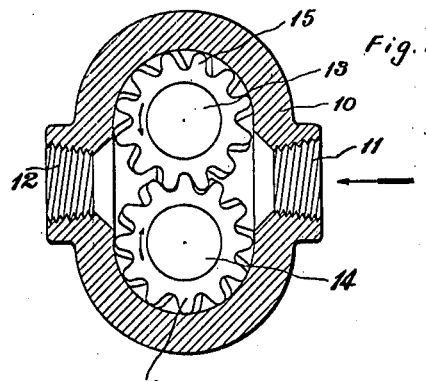
FIG. 1 is a sectional view through the gear pump.
Figure 5:
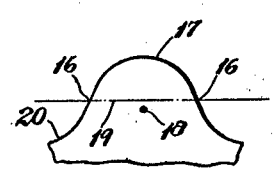
FIG. 5 is an enlarged somewhat diagrammatic view illustrating the shape of one of the gear teeth.
Figure 2:
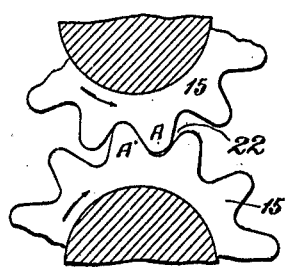
FIGS. 2, 3 and 4 show the intermeshing relationship of the gears in three different positions.
Figure 3:
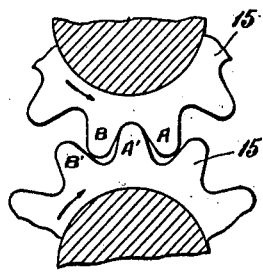
Figure 4:
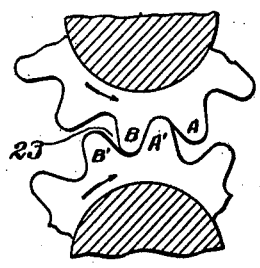
Figure 6:
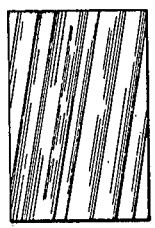
FIG. 6 is a top plan view of one of the gears.
Figure 7:
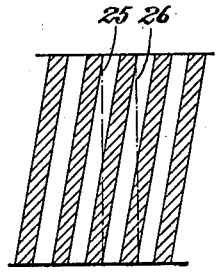
FIG. 7 is a diagrammatic sectional development of the gear teeth along the pitch line thereof.
Figure 8:
FIG. 8 is a diagrammatic view showing a relation of pressures developed in the gears.

With reference to the drawing, 10 designates the body or casing of a usual type of gear pump having an inlet opening 11 and a discharge opening 12. A pair of shafts 13 and 14 are rotatably mounted in bearings in the casing and gears 15 and 15' of identical construction are mounted on these shafts in an intermeshing relation, such as shown in FIG. 1, and are of a character such that one may drive the other. Inasmuch as these gears are of identical formation, either shaft can be a driving shaft and the gear mounted thereon be a driving gear, which the gear intermeshing with it becomes the driven gear. The shape of all the teeth on a section perpendicular to the axis is the same and is shown in an enlarged form in FIG. 5. In order that the teeth of the driving gear may transmit movement to the gear with which it intermeshes, a portion of the surface of the teeth should be a curve which is generated by or derived from an elliptic curve being joined by a circular arc, that is, the flanks of the teeth are generated by or derived from an elliptic arc and are designated by the numeral 16 in FIG. 5 and are joined by a curve 17 which is an arc of a circle with a center at 18 just below the pitch line 19 of the teeth, the surfaces 16 between adjacent teeth are joined by the same arc of said circle and this circular arc has its center just above the pitch line 19. By reason of this formation the teeth of one gear will drive the teeth of the other gear and it is immaterial which gear is the driving gear and which gear is the driven gear. Also, as the teeth are symmetrical with respect to a central radial line through the teeth, it is immaterial in which direction the gears are driven. This particular formation of teeth provides a continuity of 1.5 and thus there will be no trapping of liquid as the gears rotate. The relationship of the teeth in a profile at right angles to the axis is as shown in one position in FIG. 2, in which the tooth A' of gear 15' is driving the tooth A of gear 15 there being a freedom of flow of the liquid from the space 22 as the intermeshing of the teeth takes place. The gears in further advanced positon are shown in FIG. 3 in which the tooth A' is between the teeth A and B of the gear 15, and these gears in a similar but more advanced relation are shown in FIG. 4. At no time does the space designated in FIG. 4 as 23 completely close and therefore there are no sealed pockets of the liquid formed to trap the liquid in a space between the teeth, and due to the curved ends and roots of the teeth each tooth has its maximum displacement. Where the continuity is one-half or less while no trapping occurs, if the spur type gear were so formed, there would be an intermittent transmission of drive from one gear to the other as the continuity must be at least 1.0 for continuous or uniform transmission of power; and to avoid this undesirable result I have formed the teeth helically with an advance across the face of the gear equal to the circular pitch of the teeth. I have shown in FIG. 7 somewhat diagrammatically a development along the pitch line of the gear. The advance is shown as equal to the circular pitch, the pitch being designated by the spacing of the dotted lines 25 and 26 with the advance of the tooth across the face of the gear in the direction of the axis.

In FIG. 9 there is shown the relationship of pressure angle to the number of teeth. At C is shown a curve wherein the flanks of the teeth are portions of an involute and the tips and roots are an arc of a circle centered above and below the pitch line respectively. At A is shown the relationship with the teeth formed in accordance with this invention and at B is shown the relationship where the teeth are arcs of circles.

FIG. 10 shows the relationship between the delivery rate and coefficient of ellipse $k$ in the case where the number of teeth is equal to six and where $k$ is the ratio of the length of the minor axis to the major axis of the ellipse. The degree numbers along the curve are the minimum pressure angles.

FIG. 11 shows the profile of the tooth of the present invention. The curve marked I shows a tooth having a major portion formed by an arc of a circle centered at O, on the O–X axis which is the rack pitch line. The curve marked II is a semi-ellipse with its major axis perpendicular to the X-axis. Curve IV is a circular arc centered at a point Q below the rack pitch line joining curve II on each side of the vertical. The curve III designates the portion of curve II which cannot be used. The tooth shape of the present invention is thus seen to be curve II defining the flanks of the tooth joined by an arc of a circle IV centered at Q.

FIG. 12 is a graph showing the delivery rate of a gear pump plotted against the number of teeth and having a tooth profile generated by or derived from a circular arc not larger than 180° and shows the lower limit of the delivery rate of the present gear pump which corresponds to the available region marked B in FIG. 9.

What I claim and desire to secure by Letters Patent is:

1. In a gear pump, first and second intermeshing helical toothed gears journaled for rotation on respective first and second spaced parallel axes, each helical tooth of said gears having an advance equal to the pitch and a continuity providing a continuous driving action between the engaging teeth, the profile of each tooth being allochirally symmetrical with respect to and between a first radial line centrally through the tip thereof and to a second radial line making one-half the pitch angle with said first radial line and intersecting said profile at first and second points, the profile between said points comprising the arc of an ellipse having its major axis on said first radial line and below the pitch line.

2. In a gear pump, rotors comprising first and second intermeshing helically-toothed gears journaled on first and second spaced parallel axes, each tooth having an advance equal to the pitch and a continuity providing continuous driving action between the engaging teeth, the profile of each tooth in a plane normal thereto, being allochirally symmetrical with respect to a first radial line in said plane, centrally through the tip of the tooth, and to a second radial line in said plane making an angle $$\frac{\alpha \cos \phi}{2}$$

with said first radial line, where $\alpha$ is the pitch angle and $\phi$ is the helix angle, said lines intersecting said profile at first and second points, respectively, said profile between said points comprising the arc of an ellipse having its major axis coincident with said first line and its center below the pitch line.

3. In a gear pump as in claim 2, the projection of the tip portion of said profile onto a plane normal to the axis of rotation being the arc of a circle with center below the pitch line.

4. In a gear pump comprising first and second intermeshing helically-toothed gears journaled for rotation on first and second spaced parallel axes, each tooth having an advance equal to the pitch and a continuity providing continuous, hiatus-free driving action between engaging teeth, the profile of each tooth in a first plane normal thereto being allochirally symmetrical between first and second points determined, respectively, by the intersection with said profile of first and second radial lines in said plane, said first line passing centrally through the tip of the profile, said second line making an angle $$\frac{\alpha \cos \phi}{2}$$

with said first line, where $\alpha$ is the pitch angle and $\phi$ is the helix angle, said profile, over the working face of the tooth being in the form of an ellipse with center on said first radial line and below the pitch line, said elliptical profile portion merging smoothly at the tip, into an arc circular in a second plane normal to said axes, and at the root into an arc circular in said first plane.

5. In a gear pump as in claim 4, the elliptical and circular arcs of said profile having a common tangent at a critical point, a normal to said tangent at said point intersecting said first line at a point below the pitch line.

References Cited by the Examiner

UNITED STATES PATENTS

| | | | |
|---|---|---|---|
| 676,641 | 6/01 | Venn | 74—466 |
| 1,996,987 | 4/35 | Wildhaber. | |
| 2,026,215 | 12/35 | Cone. | |
| 2,159,744 | 5/39 | Maglott | 103—128 |
| 2,216,628 | 10/40 | Richmond. | |
| 2,261,143 | 11/41 | Davis | 74—466 |
| 2,321,696 | 6/43 | Montelius | 74—466 |
| 2,325,617 | 8/43 | Lysholm et al. | 74—466 |
| 2,473,234 | 6/49 | Whitfield | 103—128 |
| 2,486,770 | 11/49 | Whitfield | 103—128 |
| 2,530,173 | 11/50 | Oldberg | 74—466 |
| 2,622,787 | 12/52 | Nilsson | 74—466 |

DON A. WAITE, *Primary Examiner.*

LAURENCE V. EFNER, *Examiner.*